(12) United States Patent
Zhou (10) Patent No.: US 8,809,703 B2
(45) Date of Patent: Aug. 19, 2014

(54) KEYS WITH DOUBLE-DIVING-BOARD SPRING MECHANISMS

(71) Applicant: Apple Inc., Cupertino, CA (US)

(72) Inventor: Mi Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/721,644

(22) Filed: Dec. 20, 2012

(65) Prior Publication Data

US 2013/0233686 A1    Sep. 12, 2013

Related U.S. Application Data (63) Continuation of application No. 13/540,179, filed on Jul. 2, 2012, now Pat. No. 8,362,373, which is a continuation of application No. 12/724,143, filed on Mar. 15, 2010, now Pat. No. 8,212,162.

(51) Int. Cl.
| | |
|---|---|
| H01H 9/26 | (2006.01) |
| H01H 13/7073 | (2006.01) |
| F16F 3/02 | (2006.01) |
| H01H 13/7057 | (2006.01) |
| H01H 13/14 | (2006.01) |

(52) U.S. Cl.
CPC ............ *H01H 13/7073* (2013.01); *F16F 3/023* (2013.01); *H01H 13/7057* (2013.01); *H01H 2221/036* (2013.01); *H01H 2221/058* (2013.01); *H01H 13/14* (2013.01)
USPC ....................................................... 200/5 A

(58) Field of Classification Search
USPC ......... 200/5 A, 344, 275, 340, 341, 342, 343, 200/461, 512
See application file for complete search history.

(56) References Cited

U.S. PATENT DOCUMENTS

| | | | | |
|---|---|---|---|---|
| 2,476,045 | A | * | 7/1949 | Kaminky ...................... 74/100.1 |
| 3,213,244 | A | * | 10/1965 | McCarrick ..................... 337/386 |
| 3,800,104 | A | | 3/1974 | Lien et al. |
| 3,909,564 | A | | 9/1975 | Scheingold et al. |
| 4,090,229 | A | | 5/1978 | Cencel et al. |
| 4,325,102 | A | * | 4/1982 | English .......................... 200/600 |
| 4,357,646 | A | | 11/1982 | McVey et al. |
| 4,713,507 | A | * | 12/1987 | Burkhardt ...................... 200/521 |
| 4,847,452 | A | * | 7/1989 | Inaba ............................. 200/5 A |
| 4,877,347 | A | * | 10/1989 | Haftmann et al. ............ 400/479 |
| 4,952,762 | A | | 8/1990 | Koyanagi |
| 5,422,447 | A | | 6/1995 | Spence |
| 5,828,015 | A | | 10/1998 | Coulon |
| 6,940,030 | B2 | | 9/2005 | Takeda et al. |
| 7,070,349 | B2 | | 7/2006 | Dombrowski et al. |
| 8,212,162 | B2 | | 7/2012 | Zhou |
| 8,362,373 | B2 | | 1/2013 | Zhou |
| 2003/0042123 | A1 | | 3/2003 | Chun |
| 2010/0122896 | A1 | | 5/2010 | Liu |

* cited by examiner

*Primary Examiner* — Edwin A. Leon
(74) *Attorney, Agent, or Firm* — Brownstein Hyatt Farber Schreck, LLP (57) ABSTRACT

Keys may be formed for keyboards. The keyboards may be attached to electronic devices such as computers or may be formed within a portable computer or other electronic equipment. A keyboard may be provided with a planar housing member such as a top plate. The top plate may have openings through which key caps protrude. Each key cap may be attached to a respective spring mechanism. The spring mechanism for each key may have first and second diving-board structures that flex about respective parallel flex axes. A dome switch may be mounted under each spring mechanism. The dome switch is compressed when the key cap is pressed and the first diving-board structure moves towards the dome switch. The top plate may have edge portions surrounding each key opening that form upstop structures that prevent the key caps and spring mechanisms from tilting when the dome switch is compressed.

21 Claims, 6 Drawing Sheets

KEYS WITH DOUBLE-DIVING-BOARD SPRING MECHANISMS

This application is a continuation of patent application Ser. No. 13/540,179, filed Jul. 2, 2012, which is a continuation of patent application Ser. No. 12/724,143, filed Mar. 15, 2010, now U.S. Pat. No. 8,212,162, each of which is hereby incorporated by reference herein in its entirety.

BACKGROUND

This relates to electronic devices and, more particularly, to keys for electronic devices such as keyboards and equipment that includes keyboards.

Electronic devices such as computer keyboards and portable computers have keys. Keys generally include a plastic key cap attached to a switch mechanism. The key caps may be labeled with alphanumeric characters. When a key is pressed, the switch mechanism closes. The closed state of the switch mechanism may be detected by circuitry in the keyboard.

Keys are sometimes provided with springs. For example, some keyboards use a bucking spring design in which a coil spring biases each key cap. Scissor-type springs may also be used in keyboards to help provide key caps with spring action. Keyboards such as these tend to exhibit large amounts of travel. This may not be desirable, particularly in keyboard applications that require low profile designs and quiet operation.

In keyboards with relatively low amounts of key travel, key caps are sometimes attached directly to dome switches. Keyboards of this type may sometimes exhibit rattle due to insufficient control of the lateral displacement of the keycaps or may provide undesirably low amounts of tactile feedback due to the modest amount of spring action provided by the dome switches.

It would therefore be desirable to be able to provide improved keys and keyboards for use in electronic equipment such as computers and computer accessories.

SUMMARY

Keys may be provided for keyboards. The keyboards may be connected to external equipment or may be formed as an integral portion of a portable computer or other device.

Each keyboard may have a housing. The housing may have a planar upper surface such as a metal top plate that has key openings. Keys in the keyboard may be provided with key caps. Each key cap may be provided with a label. The key caps may protrude through the key openings in the metal top plate.

A double-diving-board spring mechanism may be mounted under each key cap. A dome switch may be mounted below each spring mechanism. When a user pressed downwards on a key cap, the double-diving-board spring mechanism pressed downwards on a corresponding dome switch.

Each spring mechanism may have first and second diving-board structures that flex about respective parallel flex axes. The top plate may have edge portions surrounding each key opening that form upstop structures. The upstop structures for each key may prevent the key cap and spring mechanism for that key from tilting when the dome switch for that key is compressed.

Further features of the invention, its nature and various advantages will be more apparent from the accompanying drawings and the following detailed description of the preferred embodiments.

DETAILED DESCRIPTION

This relates to keys for electronic equipment. The equipment in which the keys are provided may be a keypad, a stand-alone keyboard such as a stand-alone computer keyboard, a keyboard that is built into an electronic device such as a portable computer, or other suitable electronic devices.

Figure 1:
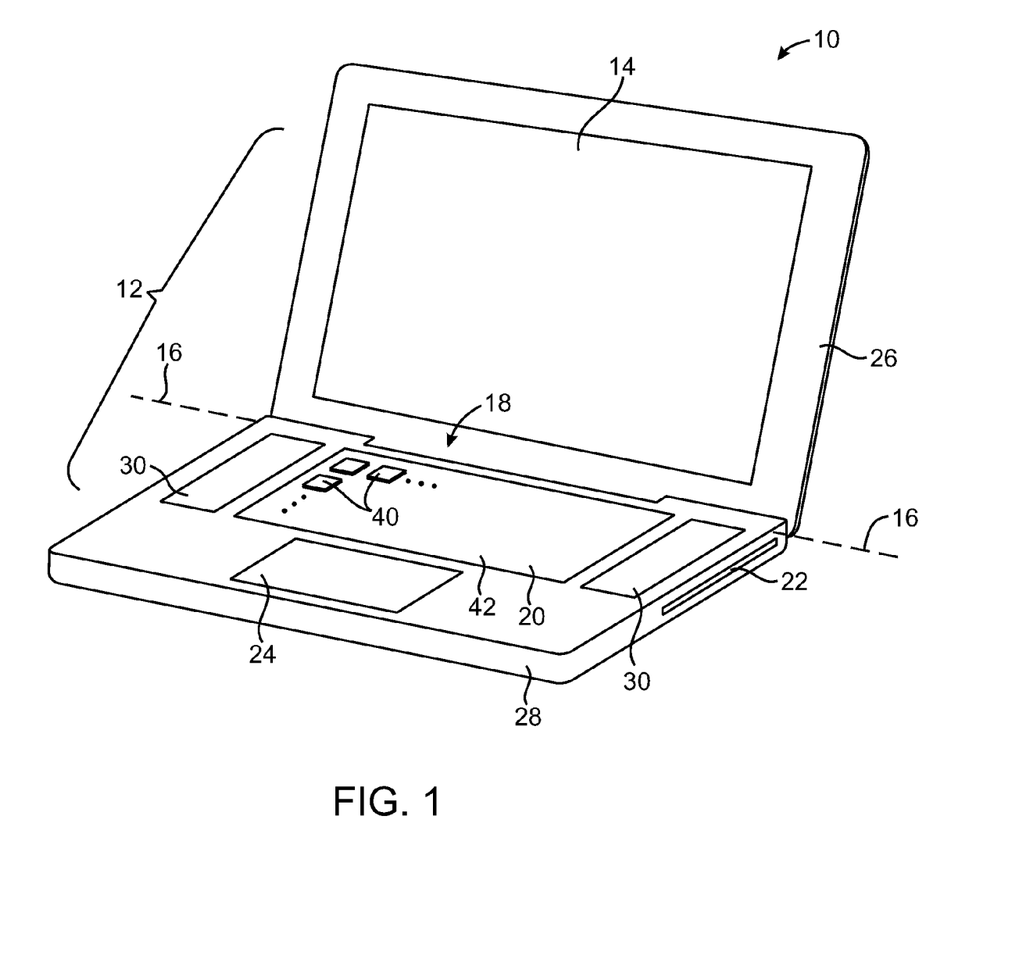
FIG. 1 is a perspective view of an illustrative portable computer that may be provided with a keyboard and keys in accordance with an embodiment of the present invention.

An illustrative computer that may be provided with a keyboard is shown in FIG. 1. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as plastic, ceramics, metal, glass, composites, etc.

Case 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover or lid, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 40. Keys 40 may protrude from planar housing surface 42. Keys 40 may include letter keys, number keys, keys labeled with symbols, or other suitable keys. Keys 40 may be individual keys or as part of a keyboard such as keyboard 20 (e.g., a QWERTY keyboard). If desired, keys 40 may be formed as part of a keypad (e.g., keyboard that contains primarily or exclusively number keys and mathematical function keys).

Additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12.

Openings may be formed in the surface of upper and lower housing portions to allow sound to pass through the walls of housing 12. For example, openings may be formed for microphone and speaker ports. With one illustrative arrangement, speaker openings such as speaker openings 30 may be formed in lower housing portion 28 by creating an array of small openings in the surface of housing 12.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Figure 2:
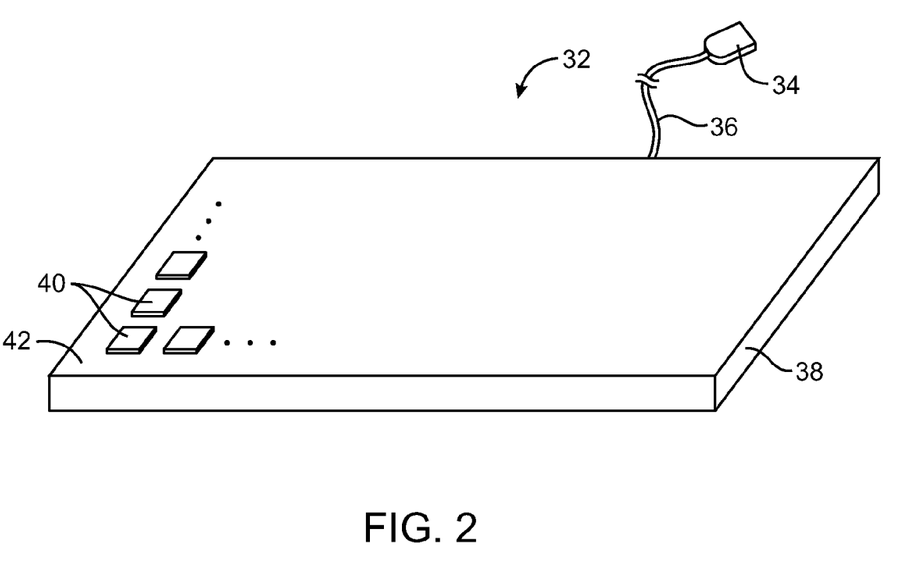
FIG. 2 is a perspective view of an illustrative keyboard that may be provided with keys in accordance with an embodiment of the present invention.

An illustrative stand-alone keyboard that may contain keys 40 is shown in FIG. 2. As shown in FIG. 2, keyboard 32 may have a housing such as housing 38. A cable 36 and connector 34 may be connected to housing 38. If desired, keyboard 32 may include batteries and wireless communications circuitry.

Housing 38 may be formed from metal, plastic, carbon-fiber composites and other composites, glass, ceramics, other materials, and combinations of these materials. Housing 38 may be formed from one or more structural pieces such as planar upper surface member 42. As with planar surface member 42 of computer 10 in FIG. 1, keys 40 may protrude through openings in planar surface 42. Planar housing surfaces such as surface 42 of FIG. 2 and surface 42 of FIG. 1 are sometimes referred to as top plates, top plate structures, and plate members. The openings that are formed in planar housing structures such as top plates 42 of FIGS. 1 and 2 may be square, rectangular, circular, oval, etc. In a typical arrangement, the openings in top plates 42 are square and rectangular and accommodate corresponding square and rectangular keys 40.

Figure 3:
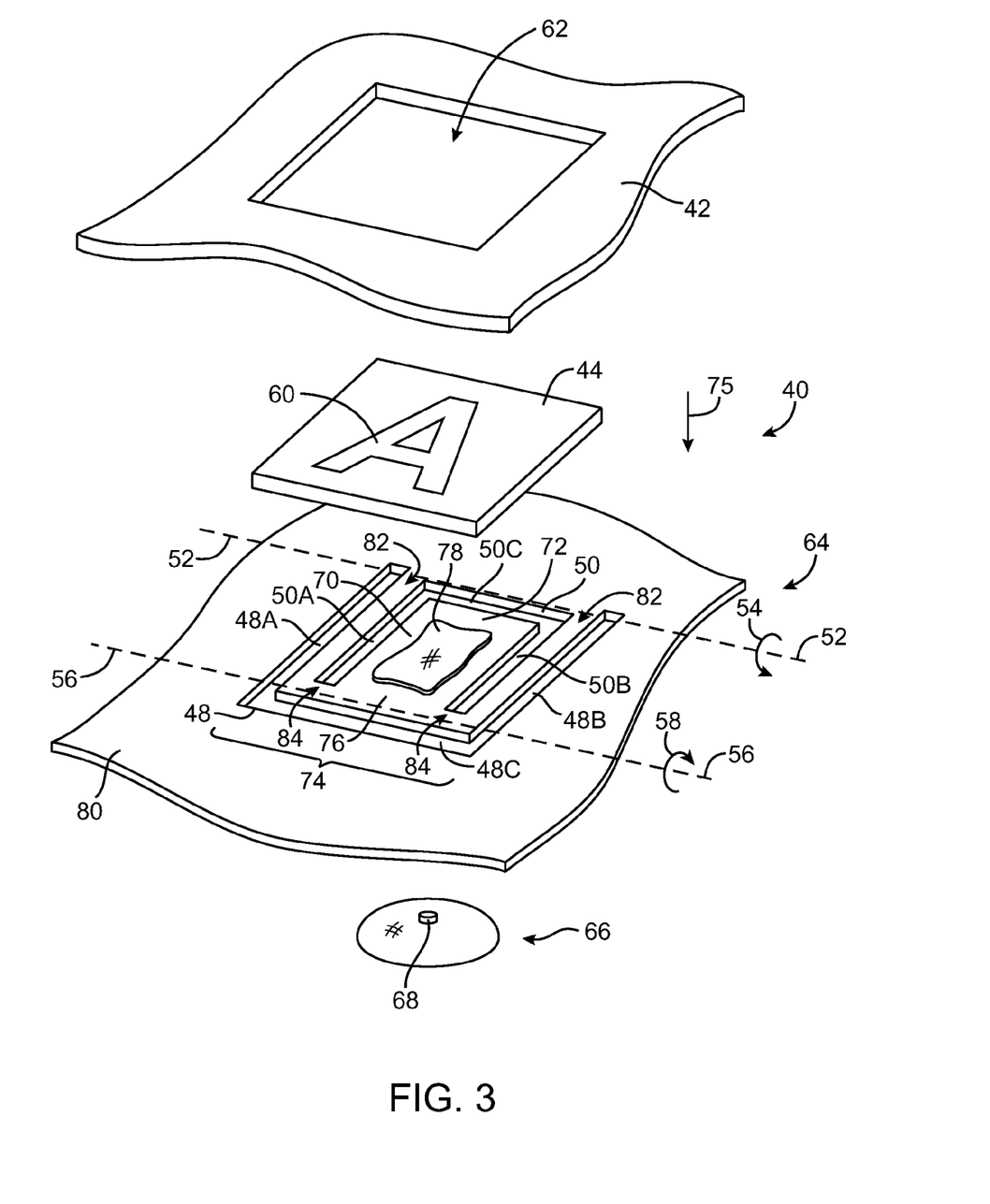
FIG. 3 is an exploded perspective view of a key for a keyboard in accordance with an embodiment of the present invention.

FIG. 3 shows an exploded perspective view of an illustrative key. As shown in FIG. 3, key 40 may include key cap 44 (sometimes referred to as a key member or button structure). A label such as an alphanumeric character or symbol may be formed on the upper surface of key cap. Label 60 may, for example, be formed by printing ink or paint on the surface of key cap 44, by machining or molding a desired shape into key cap 44, by etching a desired pattern into key cap 44, by laser etching a desired pattern into key cap 44, by laser etching a desired pattern into key cap before or after printing ink or paint on the surface of key cap 44, by attaching a sticker to the surface of key cap 44, etc. Key cap 44 may be formed from plastic, metal, glass, ceramic, composites, other materials, or combinations of these materials. For example, key cap 44 may be formed from a plastic button-shaped member.

Top plate 42 may be provided with an opening such as opening 62. Opening 62 preferably has inner dimensions that are sufficiently large to accommodate the outer periphery of key cap 44. With one suitable arrangement, there may be about a 0.1 mm to 0.3 mm clearance between each of the outer edges of key cap 44 and each of the corresponding edges of opening 62. The edges of opening 62 may be have vertical sidewalls or may have a notched shape. When provided with a notched shape, portions of key cap 44 may, if desired, overlap the edges (e.g., by covering the lower horizontal surfaces of the notches).

Top plate 42 may be formed from plastic, metal, glass, ceramic, composites, other materials, or combinations of these materials. For example, top plate 42 may be formed from a layer of metal such as aluminum. The aluminum or other metal that makes up top plate 42 may be anodized or provided with other coatings. The thickness of top plate 42 may be between 0.3 and 0.5 mm, between 0.2 and 0.6 mm, between 0.05 and 1 mm, between 0.05 and 3 mm, or may be any other suitable thickness. The top plate may, for example, form part of a unitary housing for computer housing 12 of FIG. 1 or may form part of a unitary housing for housing 38 of FIG. 2. The top plate may also be formed as a separate structure that is attached to other housing structures (e.g., to form a cover or other planar top surface for a keyboard).

Key 40 may include a spring mechanism such as spring mechanism 64. Key cap 44 may be attached to spring mechanism 64 using adhesive 78 or other suitable attachment mechanisms (e.g., screws or other fasteners, springs, clips, mating engagement features, etc.). Because spring mechanism holds key cap 44 securely within the opening 62, the outer edges of key cap 44 will generally not strike the inner edges of opening 62. This prevents the keys from rattling.

When key cap 44 is pressed downwards in direction 75 by the finger of a user or other object, central portion 70 of spring mechanism 64 may press downwards in direction 75 against dome switch 66 (e.g., on top of nub 68 of switch 66). Dome switch 66 may be formed from a flexible dome member such as an elastomeric or metal dome member. The underside of the dome member may be coated with metal, so that depression of the dome switch causes the metal to short two corresponding traces (e.g., traces on a printed circuit board to which dome switch 66 is mounted). Nub member 68 may be formed from epoxy or other suitable materials and serves as an actuation point against which spring mechanism 64 may bear when depressed.

Spring mechanism 64 may be formed from a sheet of metal, plastic, or other suitable material such a planar sheet member 80. With one suitable arrangement, sheet member 80 is formed from a layer of stainless steel that is about 0.2 mm thick, between 0.1 mm and 0.3 mm thick, between 0.05 mm and 0.3 mm thick, or between 0.05 mm and 0.7 mm thick (as examples). Thinner spring mechanism sheets tend to make spring mechanism 64 more flexible. Thicker sheets tend to make spring mechanism 64 stiffer.

Spring mechanism 64 has a double-diving-board design. Outer U-shaped groove 48 surrounds first substantially rectangular diving board structure 74. Inner U-shaped groove 50, which faces in the opposite direction from outer U-shaped groove 48, is nested within outer U-shaped groove 50 and surrounds second substantially rectangular diving board structure 70.

U-shaped groove 48 includes side grooves 48A and 48B that are connected by tip groove 48C. U-shaped groove 50 includes side grooves 50A and 50B that are connected by tip groove 50C. Adhesive 78 may be formed on diving-board structure 70.

The double diving board layout of spring mechanism 64 forms a spring that provides key cap 44 with a restoring upwards force when key cap 44 is depressed. When pressed, key cap 44 moves downwards in direction 75 and the diving-board shapes in switch mechanism 64 flex about axis 52 and 56. In particular, hinge portions 84 allow tip portion 72 of member 70 to flex downwards in direction 75, so that inner diving board structure 70 pivots in the opposite direction (i.e., direction 58) around flex axis 56. At the same time, hinge portions 82 of switch mechanism 64 allow tip portion 76 of outer diving board structure 74 to flex downwards in direction 75, so that outer diving board structure 74 pivots in direction 54 about flex axis 52. When key cap 44 moves sufficiently in direction 75, the dome membrane in dome switch 66 is compressed and the dome switch closes to indicate that key 40 has been actuated.

Because the diving board structures of switch mechanism 64 are oriented so that their tips point in opposite directions, key cap 44 does not tilt excessively when depressed near the center of key cap 44. Tip 76 of diving board structure 74 is aligned with flex axis 56 of diving board structure 70, whereas tip 72 of diving board structure 70 is aligned with flex axis 52 of diving board structure 74. As a result, the potential tilt that is induced when one diving board structure bends about its flex axis offsets the potential tilt when the other diving board structure bends about its flex axis. Because the tilts from the diving boards offset one another, key cap 44 exhibits little or no tilt as key 40 is actuated (e.g., as a user presses down on key cap 44 near the center of key cap 44). When a user presses down on key cap 44 near an edge of key cap 44, key cap 44 may exhibit limited tilt in the direction the user presses.

Figure 4:
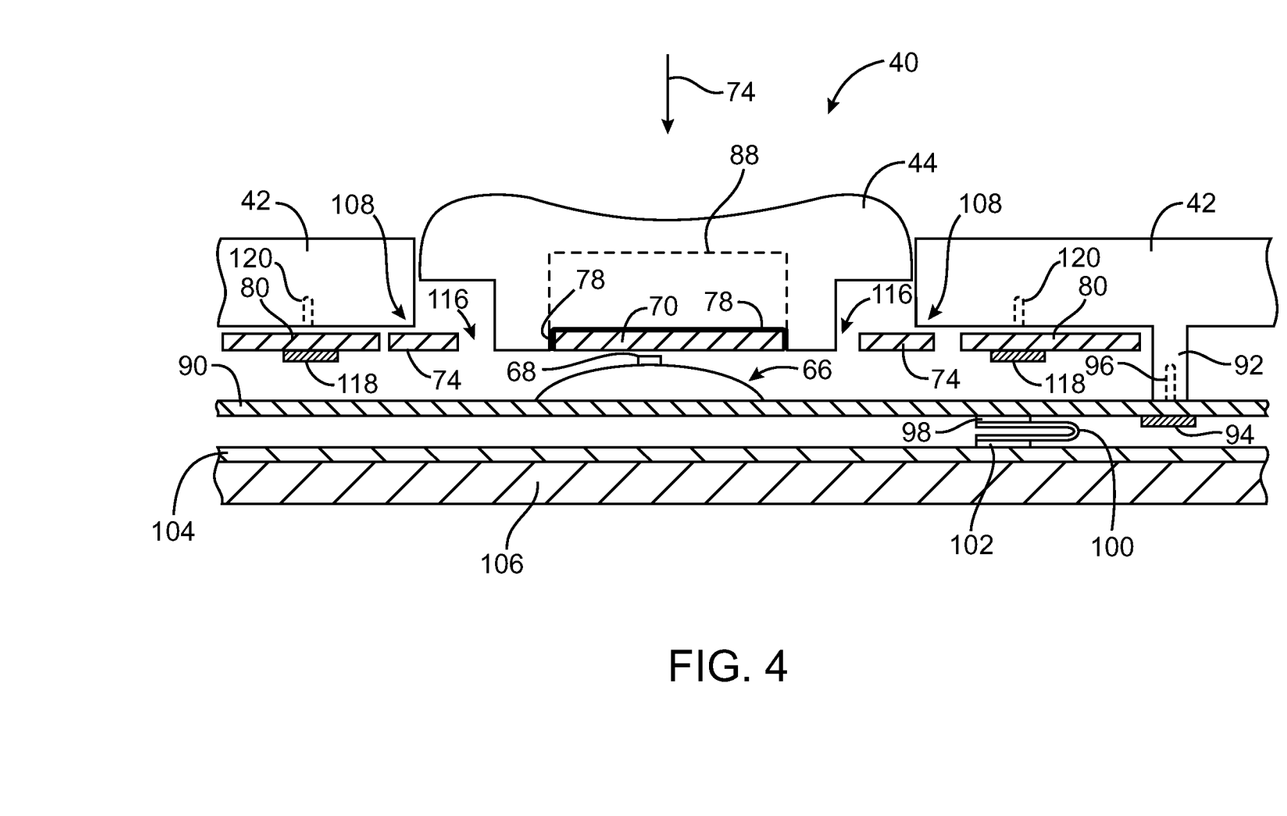
FIG. 4 is a cross-sectional side view of a key in a keyboard in accordance with an embodiment of the present invention.

A cross-sectional side view of an illustrative key cap resulting from taking a cross-section through key 40 of FIG. 3 along a cross-sectional line that is parallel to axis 56 and axis 54 is shown in FIG. 4. As shown in FIG. 4, key cap 44 rests on inner diving board member 70. In the example of FIG. 4, key cap 44 has portions 116 that bear against diving board member 70. Portions 116 may restrain the movement of key cap 44 along the horizontal axis of FIG. 4 and along the axis into and out of the plane of FIG. 4.

Key cap 44 may have an optional hollow inner cavity (cavity 88). When key cap 44 includes optional cavity 88, adhesive 78 may be located under peripheral portions of key cap 44.

In the example of FIG. 4, sheet member 80 is mounted to top plate 42. Screws 118 may be screwed into bores 120 in top plate 42 or other suitable attachment mechanisms such as adhesive may be used in securing sheet member 80 and spring mechanism 64 (e.g., diving board members 70 and 74) relative to top plate 42. In general, any desired number of screws 118 (or other attachment mechanisms) may be used in securing sheet 40 to top plate 42. Screws 118 and other attachment mechanisms used in securing sheet 40 to top plate 42 may be located in any desired locations.

Dome switch 66 may be mounted to printed circuit board 90. Printed circuit board 90 may be formed from a rigid printed circuit board substrate such as fiberglass-filled epoxy, a flexible printed circuit board substrate such as a layer of polymer (e.g., polyimide), or any other suitable substrate (e.g., plastic). Conductive traces on printed circuit board 90 may form terminals for dome switch 66. When dome switch 66 is compressed, these terminals may short to one another, thereby closing switch 66. Connectors such as connectors 98 and 102 and flex circuit cable 100 (or other suitable interconnect structures) may be used to connect printed circuit board 90 to main logic board 104. Main logic board 104 may include integrated circuits for processing key switch signals from keys 40. In the example of FIG. 4, main logic board 104 is mounted to keyboard housing structure 106 (e.g., a lower planar member that is part of housing 38 of FIG. 2 or that is part of housing 12 of computer 10 of FIG. 1). Screw 94 may be screwed into threaded bore 96 in housing boss 92 or other suitable attachment mechanisms may be used in securing boards 90 and 104 relative to top plate 42.

When key cap 44 is pressed downwards, the center of key cap 44 bears against central nub 68 on dome switch 66. In this type of situation, nub 68 may tend to serve as a central pivot point for key cap 44. If, for example, a user presses key cap 44 downwards at one of its four corners or at another off-center location, the portion of key cap 44 that is located on the opposing side of nub 68 will tend to be pivoted upwards. If not properly controlled, this tendency for key cap 44 to pivot may cause key cap 44 to tilt by an undesirable amount during use.

Top plate 42 and spring mechanism 64 (e.g., diving board member 74) may overlap to prevent tilting of key cap 44. In particular, top plate 42 may have upstop portions 108 that prevent key 40 from tilting undesirably when key 40 and diving board member 70 presses downwards on nub 68 of dome switch 66. If desired, upstop portions 108 may be formed from protrusions on plate 42. When upstop portions 108 are formed from protrusions, the upstop portions may be formed as integral portions of top plate 42 or may be formed from a layer of material that is mounted to the lower surface of top plate 42 (as examples).

During key actuation events, upstop portions 108 (e.g., the lower surfaces of portions 108) engage the corresponding portions of sheet 80 of spring mechanism 64 (e.g., the upper surfaces of portions of diving board structures 70 and 74) to prevent one edge of key cap 44 from moving upwards as an opposing edge of key cap 44 pivots downwards during key depression.

Figure 5:
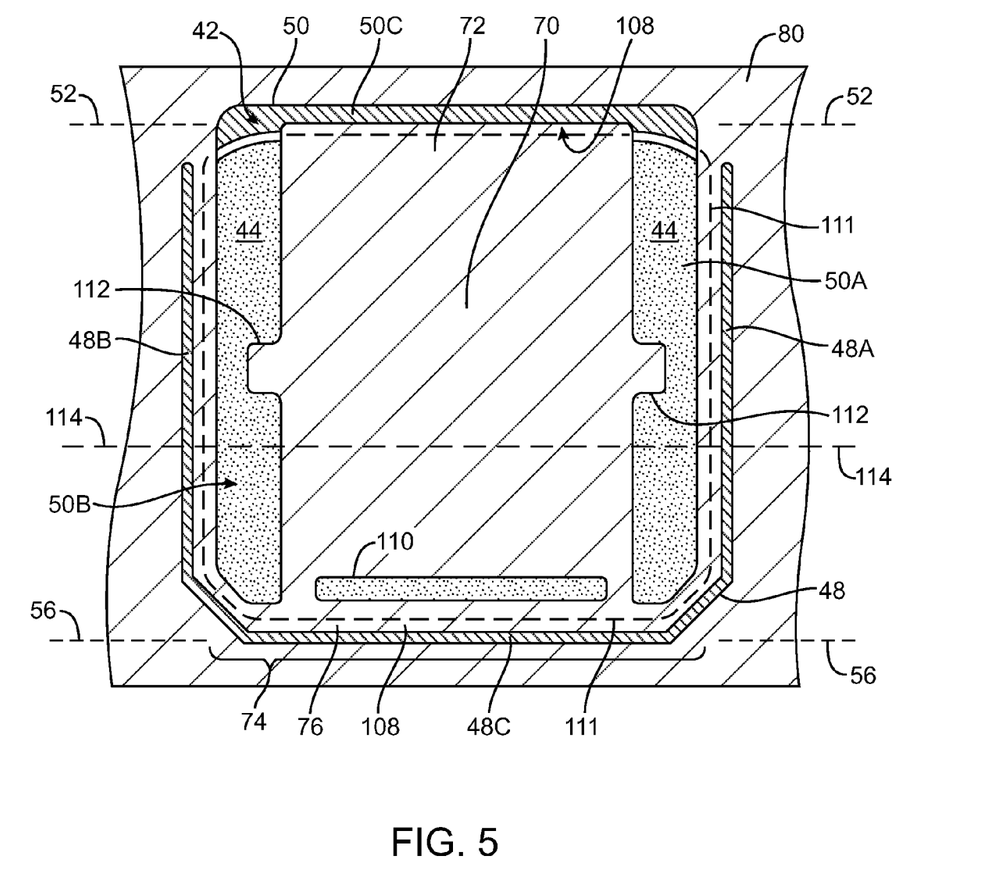
FIG. 5 is a bottom view of an illustrative key in a keyboard in accordance with an embodiment of the present invention.
Figure 6:
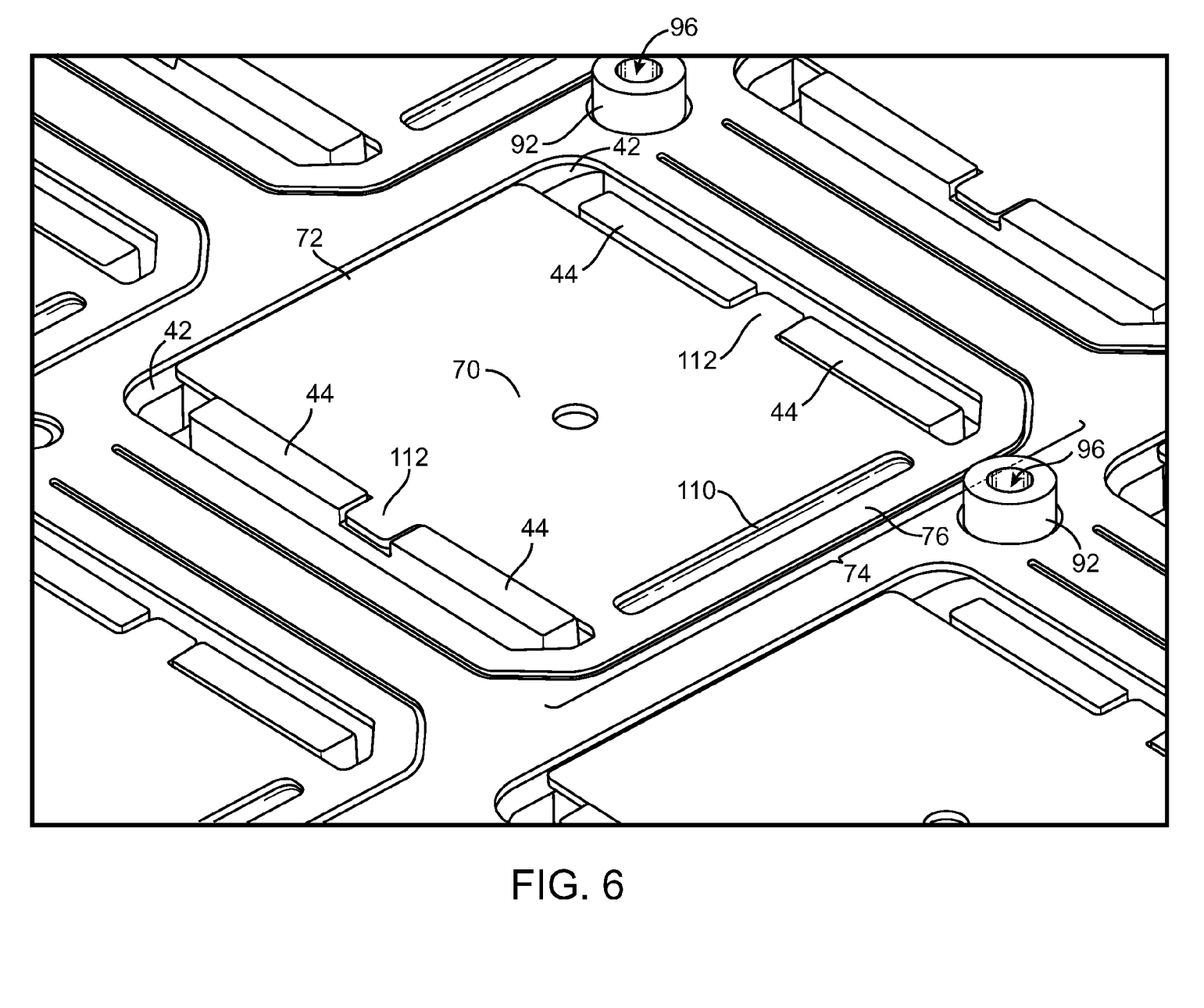
FIG. 6 is a perspective view of an illustrative key in a keyboard in accordance with an embodiment of the present invention.

FIG. 5 shows a bottom view of key 40 and FIG. 6 shows a perspective bottom view of key 40. FIGS. 5 and 6 illustrate how upstop portions 108 may overlap tip portion 72 of inner diving board structure 70 and the edges and tip portion 76 of outer diving board structure 74. Dashed line 114 (FIG. 5) shows where the cross-section of FIG. 4 was taken. Dashed line 111 (FIG. 5) follows the inner perimeter of upstop portions 108 of top plate 42 (i.e., the innermost edges of opening 62 of FIG. 3). As shown in FIGS. 5 and 6, additional groove structures such as groove opening 110 may be formed in sheet 80 to help provide the diving-board hinges formed from sheet 80 with a desired amount of flexibility.

Diving board structure 70 and key cap 44 may, if desired, be provided with mating features that help align key cap 44 on spring mechanism 64. For example, diving board structure 70 or other portions of sheet 80 in spring mechanism 64 may be provided with protrusions 112 that mate with corresponding recesses in the bottom of key cap 44.

The foregoing is merely illustrative of the principles of this invention and various modifications can be made by those skilled in the art without departing from the scope and spirit of the invention. The foregoing embodiments may be implemented individually or in any combination.

What is claimed is:

1. A spring mechanism, comprising
a sheet of material;
first and second spring structures formed in the sheet of material, the first spring structure defined by a first U-shaped groove and the second spring structure defined by a second U-shaped groove positioned entirely within an area defined by the first U-shaped groove, the second spring structure including at least one additional groove positioned between end portions of the second U-shaped groove, wherein the first and second spring structures flex about respective flex axes and lie in a common plane in the absence of an applied force.

2. The spring mechanism of claim 1, wherein the first and second spring structures are adapted to engage a key cap mounted on the sheet of material, the key cap adapted to transmit a force from a key cap surface to the first and second spring structures.

3. The spring mechanism of claim 1, wherein the first and second spring structures each have a tip and wherein the tips of the first and second spring structures are pointed in different directions.

4. The spring mechanism of claim 2, wherein the first and second spring structures engage the key cap through a top plate structure having an opening through which the key cap protrudes.

5. The spring mechanism of claim 4, wherein the top plate comprises metal.

6. The spring mechanism of claim 5, wherein the metal comprises an aluminum sheet with a thickness of between 0.05 and 3 mm.

7. The spring mechanism of claim 6, wherein the sheet of material comprises a sheet of metal.

8. The spring mechanism of claim 7, wherein the a sheet of metal comprises at least two U-shaped grooves.

9. The spring mechanism of claim 8, wherein the sheet of metal comprises a sheet of stainless steel with a thickness of between 0.1 mm and 0.3 mm.

10. The spring mechanism of claim 1, wherein the sheet of material comprises a sheet of metal having the first U-shaped groove and the second first U-shaped groove.

11. The spring mechanism of claim 10, further comprising adhesive that attaches the key cap to the first spring structure.

12. The spring mechanism of claim 10, further comprising a dome switch mounted under the sheet of material.

13. An electronic device, comprising
   a housing structure having a plurality of openings; and
   a plurality of spring mechanisms, wherein each of the spring mechanisms is associated with a respective one of the openings and each of the spring mechanisms comprises first and second spring structures, each of the first spring structures defined by a respective first U-shaped groove and each of the second spring structures defined by a respective second U-shaped groove positioned entirely within an area defined by the respective first U-shaped groove, each of the second spring structures including at least one additional groove positioned between end portions of the second U-shaped groove, that flex about respective flex axes and that are approximately parallel to the housing structure in the absence of an applied force.

14. The electronic device of claim 13, further comprising a plurality of keys each of which protrudes through a respective one of the openings, wherein each of the keys is associated with a respective one of the spring mechanisms.

15. The electronic device of claim 14, wherein each key comprises a key cap member attached to a respective one of the spring mechanisms and wherein the first and second spring structures of the spring mechanisms are formed from grooves in a sheet of metal.

16. The electronic device of claim 15, wherein, for each of the keys, when a respective one of the keys is not being depressed, the first and second spring structures associated with that key are approximately parallel to the sheet of metal.

17. The electronic device of claim 14, further comprising a plurality of dome switches each of which is associated with a respective one of the keys, wherein the housing structure comprises upstop portions that prevent tilting of the spring mechanisms when the dome switches are depressed.

18. An electronic device, comprising
   a housing structure having an opening; and
   a sheet of metal having grooves that define first and second spring structures in the sheet of metal, the first spring structure defined by a first U-shaped groove and the second spring structure defined by a second U-shaped groove positioned entirely within an area defined by the first U-shaped groove, the second spring structure including at least one additional groove positioned between end portions of the second U-shaped groove, wherein the first and second spring structures are associated with the opening and flex about respective parallel flex axes and lie in a common plane in the absence of an applied force.

19. The electronic device of claim 18, further comprising a key cap member that protrudes through the opening, wherein the key cap is associated with the first and second spring structures.

20. The electronic device of claim 19, further comprising a dome switch that is compressed by the first spring structure when the key cap member is depressed, wherein the housing structure comprises upstop structures that prevent pivoting of the key cap member when the key cap member is depressed and the dome switch is compressed.

21. The electronic device of claim 19, wherein, the key cap member is not being depressed, the first and second spring structures are approximately parallel to the housing structure.

* * * * *